July 10, 1951 — W. J. NANFELDT — 2,560,033

FRICTION ELEMENT BONDING FILM

Filed Sept. 8, 1950

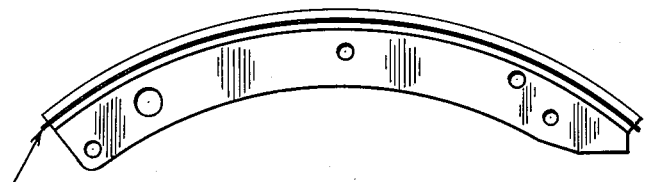

ADHESIVE FILM FABRICATED PER THIS SCHEDULE

| MATERIAL ADDED | | PROCESSING CONDITIONS | | |
|---|---|---|---|---|
| INGREDIENT | AMOUNT (PARTS BY WEIGHT) | TYPE OF MILL | TEMP. (°C.) | DURATION UNTIL ADDITION OF NEXT INGREDIENT (MINUTES) |
| BUTADIENE – ACRYLONITRILE COPOLYMER CONTAINING 35°-45% ACRYLONITRILE, BALANCE BUTADIENE, SOAP FREE | 100 | DIFFERENTIAL ROLL | <85 | 3-8 |
| BENZOTHIAZYL DISULFIDE | 1.5-2.5 | DIFFERENTIAL ROLL | <85 | .5-5 |
| PHENYL-α-NAPHTHYLAMINE | 0.75-1.5 | | | |
| DIALKYL PHTHALATE (ALKYL GROUPS CONTAINING FROM 7 TO 12 CARBON ATOMS) | 6-10 | DIFFERENTIAL ROLL | <85 | 10-20 |
| DIBASIC-ACID-GLYCOL POLYESTER PLASTICIZER | 5-10 | | | |
| BENZOTHIAZYL DISULFIDE | 1.5-2.5 | DIFFERENTIAL ROLL | <85 | 3-8 |
| ZINC OXIDE | 3-8 | | | |
| SULFUR | 2-6 | | | |
| NO MILLING – AGE STOCK FOR 6-8 HOURS | | | | |
| CASHEW NUT OIL MODIFIED PHENOL-FORMALDEHYDE RESIN (1ST PORTION) | 20-30 | EVEN SPEED ROLL | <75 | 7 |
| NO MILLING – AGE STOCK FOR 18-32 HOURS | | | | |
| CASHEW NUT OIL MODIFIED PHENOL-FORMALDEHYDE RESIN (2ND PORTION) | 20-30 | EVEN SPEED ROLL | <75 | 10-20 |
| PHENOL-FORMALDEHYDE RESIN | 70-90 | | | |
| NO MILLING – AGE STOCK FOR 18-32 HOURS | | | | |
| NO ADDITIONAL INGREDIENT | | EVEN SPEED ROLL | <73 | 6 PASSES THROUGH THE NIP TO WARM UP |
| CALENDER INTO FILM | | CALENDER | <80 | |

INVENTOR.
WILLIAM J. NANFELDT
BY
Ely & Frye
ATTORNEYS

Patented July 10, 1951

2,560,033

UNITED STATES PATENT OFFICE 2,560,033

FRICTION ELEMENT BONDING FILM

William J. Nanfeldt, New Castle, Ind., assignor to The Firestone Tire & Rubber Company, Akron, Ohio, a corporation of Ohio Application September 8, 1950, Serial No. 183,698

8 Claims. (Cl. 154—130)

This invention relates to films of thermally-activatable adhesive composition for use in adhering facing elements of frictional material to brake shoes, clutch discs and the like.

The use of adhesive films for securing facing elements to brake shoes and similar structures offers many advantages over the conventional use of rivets for this purpose, notably a more complete utilization of the frictional material and avoidance of scoring of the opposed friction surface when the facing elements are worn down. However, the films heretofore employed have had certain shortcomings, particularly unreliability of the bond, and deterioration of the film in storage before use. Accordingly, there exists a considerable field for the introduction of novel bonding films of improved properties.

It is therefore an object of this invention to provide novel heat-activatable adhesive films for friction element facings.

Another object is to provide such films which will establish bonds of improved strength and shock resistance.

A further object is to provide such films which will afford a more uniform and reliable adhesion.

A still further object is to provide such films which will not deteriorate in storage before use.

SYNOPSIS OF THE INVENTION

The above and other objects are secured, in accordance with this invention, in films prepared from certain ingredients, and in accordance with a particular sequential time schedule of addition, as set forth in the accompanying Table A. Any departure from the range of ingredients and mode of compounding set forth will result in a film product having adhesive and/or storage properties which are inferior to those of the present invention.

Table A

| Ingredient Added | | Treatment Upon Addition | | |
|---|---|---|---|---|
| Name of Ingredient | Amount, parts by weight | Type of Mill | Temp., °C. | Duration Until Addition of Next Ingredient, Minutes |
| Butadiene-acrylonitrile copolymer containing 30-45% acrylonitrile, balance butadiene, soap free. | 100 | Differential Roll | 85 | 3-8 |
| Benzothiazyl disulfide | 1.5-2.5 | ----do---- | 85 | .5-5 |
| Phenyl-α-naphthylamine | 0.75-1.5 | | | |
| Dialkyl Phthalate (alkyl groups containing from 7 to 12 carbon atoms). | 6-10 | ----do---- | 85 | 10-20 |
| Dibasic-acid-glycol polyester plasticizer | 5-10 | | | |
| Benzothiazyl disulfide | 1.5-2.5 | ----do---- | 85 | 3-8 |
| Zinc oxide | 3-8 | | | |
| Sulfur | 2-6 | | | |
| No milling—age stock for 6-8 hours. | | | | |
| Cashew nut oil modified phenol-formaldehyde resin (1st portion). | 20-30 | even speed roll | 75 | 7 |
| No milling—age stock for 18-32 hours. | | | | |
| Cashew nut oil modified phenol-formaldehyde resin (2nd portion). | 20-30 | ----do---- | 75 | 10-20 |
| Phenol-formaldehyde resin | 70-90 | | | |
| No milling—age stock for 18-32 hours | | | | |
| No additional ingredient | | ----do---- | 73 | [1] 4-12 |

[1] Passes through the nip to warm up.

In the resultant films, the butadiene-acrylonitrile copolymer forms a continuous phase, in which the cashew nut oil modified phenol-formaldehyde resin and the phenol-formaldehyde resin are dispersed as granular, separate, discontinuous phases. In use, the film is interposed between a facing element of frictional material (say an organic composition brake lining) and a friction element backing (say a brake shoe); the assembly is subjected to pressure to hold the components together; and the temperature raised to 320° to 500° F. The dispersed resins fuse, imbibe the phthalate ester and polyester plasticizers, and blend with the butadiene-acrylonitrile copolymer to form a single, plastic, readily flowable phase. The film flows into the irregularities in the facing element and backing, and becomes cured to form a strong, shock resistant adhesive bond between the components of the assembly. The assembly is then cooled and removed from the pressing mechanism.

In comparison to other compositions heretofore proposed for this purpose, the compositions prepared in accordance with the process of this invention yield bonds which have much greater strength and shock resistance. These improved properties are much more reliably obtainable in accordance with the process of this invention; whereas with prior art compositions, a substantial proportion of the assemblies fabricated have defective and weak bonds. The adhesive films of this invention have excellent shelf life, in that they may be kept for considerable periods of time before use without adversely affecting the quality of the bonds produced.

THE BUTADIENE-ACRYLONITRILE COPOLYMER

As noted above, an essential feature of the butadiene-acrylonitrile copolymer is that it shall be free from soap. Butadiene and acrylonitrile are copolymerized on a commercial basis by emulsifying the monomers in water with the aid of soap or other emulsifiers, and subjecting the emulsion to heat and catalysts. The resultant emulsion or latex of the copolymer is then coagulated by addition of precipitating agents. In ordinary practice, a considerable amount of soap residue is left in the copolymer by the coagulation treatment. The use of copolymers containing such soap residues interferes with the bonding action of the adhesive compositions of this invention. The maximum amount of soap which can be tolerated in the practice of this invention is about 2%, based on the weight of the copolymer. In order to obtain copolymers of the cited low soap content, it is desirable to employ only a very minimum amount of soap in the original polymerization recipe. Upon conclusion of the polymerization, the polymer should be precipitated from the latex by the use of techniques which will ensure a minimum entrainment of soap residues with the coagulum, and the coagulum should be carefully and thoroughly washed after the precipitation. Generally, the "salt-acid" technique of precipitation will be employed, followed by washing with aqueous caustic alkali solutions, as any soaps entrained by the precipitation in this process will be converted to the corresponding fatty acids, and will be extracted and removed by the caustic solution. In the foregoing discussion the terms "soap" and "soap residues" as referring to materials found in the copolymers are interchangeably intended to refer to soaps properly speaking, i. e., ammonium or alkali metal salts of fatty or rosin acids containing from 10 to 22 carbon atoms, or the conversion products thereof produced by the coagulating agents used, e. g. the free fatty acids or the aluminum, calcium, magnesium or other metal salts thereof; the maximum permissible percentage of 2% above cited is to be calculated as the total weight of all of these soaps, acids or salts combined.

As is well known, the butadiene-acrylonitrile copolymers are supplied commercially with various ratios of these monomers contained therein. The butadiene-acrylonitrile copolymers for use in this invention should be in the higher range of acrylonitrile content, and should contain from 30% to 45% by weight of acrylonitrile, balance butadiene.

THE DIALKYL PHTHALATE PLASTICIZER

This may be any alkyl phthalate plasticizer in which the alkyl groups each contain from 7 to 12 carbon atoms. Examples of such esters are di-n-heptyl phthalate, dicapryl phthalate, di(2-ethyl hexyl) phthalate, di-sec.-octyl phthalate, di-n-nonyl phthalate, di-n-decyl phthalate and di-n-dodecyl phthalate. Ester plasticizers of this type are characterized by full compatibility with the butadiene-acrylonitrile copolymer and the dibasic acid glycol polyester plasticizer, but only partial compatibility with the cashew nut oil modified phenol formaldehyde resin or the simple phenol-formaldehyde resin. At the temperatures at which the adhesives are cured, however, these materials all become fully compatible with each other.

THE DIBASIC ACID GLYCOL POLYESTER PLASTICIZERS

These are subresinous linear polyester condensation products of (A) $\alpha,\omega$-polymethylene dicarboxylic acids containing from 6 to 12 carbon atoms with (B) ethylene glycol, which condensation products may have a molecular weight of from 1000 to 3000. Suitable acids are thus seen to include adipic, pimelic, suberic, azelaic, sebacic, undecanedioic and dodecanedioic acids. These linear condensation polymers are viscous liquid products which become compatible with the cashew nut oil modified phenolic resin and the simple phenolic resin at the elevated temperatures at which the curing of the adhesive film in the assembly is conducted.

THE CASHEW NUT OIL MODIFIED PHENOL ALDEHYDE RESIN

These resins are produced by condensing together (A) phenol or a cresol with (B) formaldehyde and with (C) cashew nut shell oil, its heat conversion products such as described in Harvey 1,821,095, its dicarboxylation product known as "Cardanol," or the compound known as "cardol" having the formula $C_{32}H_{52}O_4$ and occurring as such in cashew nut shell oil. In the condensation mass, the cashew nut shell oil or equivalent as above set forth is present to the extent of from 7% to 25%, based on the total weight of phenol and/or any cresols. The formaldehyde is used in such quantity as to provide .5 to 1.0 mole per mole of the phenolic constituents, the moles of phenolic constituents being computed as the total moles of phenol plus total moles of any cresols plus total moles of the cashew nut shell oil or equivalents. The cresols should not be present to the extent of more than 20%, based on the total weight of phenol and cresols. The condensation is carried out at temperatures between 120° C. and 230° C., preferably in the presence of one or two percent of an acidic catalyst such as sulfuric acid, hydrochloric acid, oxalic acid or the like. When the condensation has progressed to desired extent, i. e., before the mass becomes infusible, the catalyst if present is neutralized with a suitable base, and the resin cooled and pulverized. Before use, in order that the resin may cure effectively to an insoluble state, the resin is compounded with an amine-type curing agent, preferably hexamethylene tetramine, since this compound also provides additional formaldehyde to assist in the cure.

THE SIMPLE PHENOL-ALDEHYDE RESIN

This is a well-known type of resin produced by condensing phenol, or a mixture thereof with not more than 20% of one or more cresols, with formaldehyde. The formaldehyde is supplied to the extent of from .5 to 1.0 mole per mole of phenolic constituent, the moles of phenolic constituents being calculated as the total of moles of phenol plus moles of any cresols present.

The condensation is carried out at temperatures between 70° C. and 180° C., preferably in the presence of an acidic catalyst such as sulfuric acid, hydrochloric acid, oxalic acid or the like. When the condensation has proceeded to the desired extent, i. e., before the mass has become infusible, the catalyst is neutralized with a suitable base, and the mass cooled to solidify it, and pulverized. Before use, in order that the resin may cure effectively to an insoluble state, the resin is compounded with an amine-type curing agent, preferably hexamethylene tetramine, since this compound also supplies additional formaldehyde, to assist in the cure.

THE COMPOUNDING AND MILLING PROCEDURE

The compounding and milling procedure set forth in Table A above must be rigidly adhered to, as otherwise inferior products result. As set out in this schedule, the components are added one by one (except in those cases, e. g. the benzothiazyl disulfide and phenyl-α-naphthylamine where two or more ingredients are shown bracketed together, in which case they are added together on the mill and processed as a single additive) and then processed under the conditions and for the length of time indicated in the last three columns of the table. Thereupon the next ingredient is added and processed for the indicated time, and so on with the successive ingredients in the order in which they appear.

resins with the other constituents to form a single phase therewith. As noted above, an essential characteristic of the films of this invention, prior to assembly and curing with the friction facing and support, is that they shall be constituted of a continuous phase comprising predominantly the butadiene-acrylonitrile copolymer phase, with the cashew nut oil modified phenol-formaldehyde resin and simple phenolic resin dispersed therein as separate discontinuous phases. To this end, therefore, the temperature is kept down during the addition of these resins, and even-speed roll mills rather than differential roll mills are employed in order to avoid the intensive frictional action of the latter type of mill.

A brake shoe assembly bonded in accordance with this invention is shown in the accompanying drawing.

With the foregoing general discussion in mind, there is given herewith a detailed example of the practice of this invention. All parts given are by weight.

*Example*

PREPARATION OF FILM

The ingredients employed in this example are listed herewith in Table I, and were combined in the order, and under the conditions and duration of treatment, in which they appear in the table.

*Table I*

| Ingredient | | Processing Conditions | | |
|---|---|---|---|---|
| Name | Am't., Parts by Weight | Type of Mill | Temp., °C. | Duration Until Addition of Next Ingredient, Minutes |
| Butadiene-Acrylonitrile Copolymer (containing 39% acrylonitrile, balance butadiene : fatty acid residues less than 0.5%, based on the weight of copolymer). | 100 | differential roll | 83 | 4 |
| Phenyl-α-Naphthylamine | 1.5 | do | 84 | 2 |
| Benzothiazyl disulfide | 2 | | | |
| Dicapryl phthalate | 8 | do | 82 | 15 |
| "Paraplex G-50" a linear polyester of etheylne glycol and sebacic acid having an average molecular weight of 2,300: manufactured by Rohm and Haas Co. | 6 | | | |
| Benzothiazyl disulfide | 2 | | | |
| Channel black | 1 | do | 82 | 4 |
| Zinc Oxide | 5 | | | |
| Sulfur | 3 | | | |
| The stock is removed from the rolls and aged for 7 hours at room temperature. | | | | |
| Phenol-cashew nut-formaldehyde resin ¹ | 25 | even speed roll | 73 | 7 |
| The stock is removed from the mill and aged at room temperature for 24 hours. | | | | |
| Phenol-cashew nut-formaldehyde resin ¹ | 25 | even speed roll | 70 | 1¼ |
| Phenol-aldehyde resin ² | 80 | | | |

¹ This resin was produced by condensing together 100 parts of phenol, 37.83 parts of cashew nut shell oil and 50 parts of formalin (containing 37% of formaldehyde by weight) in the presence of 2 parts of sulfuric acid. The finishing temperature was 210° C., and the melting range of the resin is 70°–75° C. The resin is combined with 8% by weight of hexamethylene tetramine before use.

² This resin was produced by condensing together 3,000 parts of a crude phenol containing by weight 92% phenol, balance cresols, and 2,100 parts of formalin (containing 37% formaldehyde by weight) in the presence of 60 parts of oxalic acid and 120 parts of water. The finishing temperature of the condensation was 115° C., and the melting range of the resin is 84–88° C. The resin is neutralized by the addition of 1½% of lime, and contains 7% of hexamethylene tetramine by weight.

At certain points in the process, the entire batch is removed from the mill and allowed to age for the indicated time: this serves to permit the ingredients to mutually diffuse and come to equilibrium, without deleterious effect of mechanical working which it is desirable to minimize through the process of this invention. Particularly at the points in the process of this invention subsequent to the addition of the cashew nut oil modified phenolic resin, it is of cardinal importance to limit the severity and temperature of working so as to avoid fusion of this resin or of the simple phenol-formaldehyde resin and consequent premature merger of these The stock was removed from the mill as slabs 2 feet long, 1 foot wide and one-eighth inch thick, and the slabs aged 24 hours at room temperature. Thereafter the slabs were passed (not banded) six times through the rolls of an even speed roll mill to warm up the stock, and thereafter calendered out on a three roll calender having a roll temperature of 80° C. to form a film having a thickness of .010 inch. This film was cooled and wound for storage with an interliner of holland cloth.

USE IN FRICTION ASSEMBLY

The film is used as follows. A steel automotive brake shoe is cleaned, and a conventional organic composition brake lining laid up thereon with a strip of the film interposed between the brake shoe and lining. The assembly is then clamped in a jig which applies a pressure of 30 pounds per square inch, and subjected to a temperature of 350° C. for 20 minutes. The assembly is then cooled to room temperature and removed from the jig. Excellent adhesion was obtained between the brake lining and brake shoe. The shearing strength was 875 pounds per square inch of adhesion surface, and the failure occurred in the lining, rather than in the adhesive bond or interface between the steel and adhesive bond.

Brake linings adhered to brake shoes exactly as above described and installed in automotive vehicles gave excellent service over extended periods of time.

AGEING TEST

In order to demonstrate the excellent storage properties of the adhesive films of this invention, samples of the film were stored at 40° F., 75° F., and 100° F. for various periods of time. The samples after storage were tested as follows.

For each test there was provided a pair of steel buttons having circular faces 1.129±.001 inch in diameter and planar to an accuracy of .000012 inch tolerance. The planar faces of the buttons were brought together with a sample of the film under test interposed therebetween, and the assembly was placed in a clamp to hold the faces together with a pressure of 200 pounds per square inch, heated at 400° C. for one hour, cooled in the clamp to 75° F., and removed from the clamp. The resultant adhered assembly was placed in a tensile testing machine arranged to pull the buttons apart by forces directed normal to the planar surfaces of the buttons. This test was conducted either with the assembly at 75° F. or at 210° F. The result was calculated as the stress in pounds per square inch required to rupture the bond between the buttons. Set forth herewith in Table II are the particulars of the storage conditions, and tests run upon the various film samples.

*Table II*

| Duration of Ageing, days | Tensile Strength of Bond From Film Aged At— | | | | | |
|---|---|---|---|---|---|---|
| | 40° F. | | 75° F. | | 100° F. | |
| | Tensile Strength Run At 75° F. | Tensile Strength Run At 210° F. | Tensile Strength Run At 75° F. | Tensile Strength Run At 210° F. | Tensile Strength Run At 75° F. | Tensile Strength Run At 210° F. |
| 4 | 4,750 | 1,910 | 4,450 | 1,780 | 4,600 | 2,020 |
| 18 | 4,750 | 2,150 | 5,050 | 2,020 | 5,400 | 2,190 |
| 32 | 5,650 | 2,210 | 5,450 | 2,370 | 4,950 | 2,070 |
| 50 | 4,600 | 2,170 | 4,550 | 2,150 | 5,350 | 1,900 |

In addition, adhered brake shoe assemblies were made from films stored for 32 days at 40° F., 75° F. and 100° F., and the shear strength of the resultant bonds determined. The assemblies were made, and the shear test conducted as described hereinabove under "Use in friction assembly." Tabulated herewith are the results of the tests.

*Table III*

| | Film Stored For 32 Days At— | | |
|---|---|---|---|
| | 40° F. | 75° F. | 100° F. |
| Shear Strength (pounds per square inch) | 850 | 750 | 780 |

From the foregoing general description and detailed specific instructions, it will be evident that this invention provides novel heat activatable adhesive films for brake shoes and other friction elements which provide a superior adhesive action. The films may be stored for considerable periods of time without deleterious effect upon their adhesive behavior. The materials entering into the composition of the films are cheaply and readily available.

What is claimed is:

1. Process which comprises milling together the following ingredients, in accordance with the following sequential schedule of time, temperature and equipment

| Ingredient | | Processing Conditions | | |
|---|---|---|---|---|
| Name | Am't., Parts by Weight | Type of Mill | Temp., °C. | Duration Until Addition of Next Ingredient, Minutes |
| Butadiene-Acrylonitrile Copolymer containing 30-45% Acrylonitrile, balance butadiene, substantially soap free. | 100 | Differential Roll | 85 | 3-8 |
| Benzothiazyl Disulfide | 1.5-2.5 | do | 85 | .5-5 |
| Phenyl-α-naphthylamine | 0.75-1.5 | | | |
| Dialkyl Phthalate (alkyl groups containing from 7 to 12 carbon atoms) | 6-10 | do | 85 | 10-20 |
| α,ω-Polymethylene dicarboxylic acid-glycol polyester plasticizer of molecular weight 1,000-3,000 | 5.10 | | | |
| Benzothiazyl disulfide | 1.5-2.5 | do | 85 | 3-8 |
| Zinc Oxide | 3-8 | | | |
| Sulfur | 2-6 | | | |
| No milling—age stock for 6-8 hours | | | | |
| Cashew nut oil modified phenol-formaldehyde resin (1st portion) | 20-30 | even speed roll | 75 | 7 |
| No milling—age stock for 18-32 hours | | | | |
| Cashew nut oil modified phenol-formaldehyde resin (2nd portion) | 20-30 | do | 75 | 10-20 |
| Phenol-formaldehyde resin | 70-90 | | | |
| No milling—age stock for 18-32 hours | | | | |
| No additional ingredient | | do | 73 | [1] 6 |

[1] Passes through the nip to warm up.

and thereafter calendering out the compound, immediately after warming up, and at a temperature from 50° to 80° C., into a sheet from .005 to .020 inch thick.

2. Process which comprises milling together, the following ingredients, in accordance with the following approximate sequential schedule of time, temperature and equipment

| Ingredient | | Processing Conditions | | |
|---|---|---|---|---|
| Name | Am't., Parts by Weight | Type of Mill | Temp., °C. | Duration Until Addition of Next Ingredient, Minutes |
| Butadiene-Acrylonitrile Copolymer containing 39% acrylonitrile, balance butadiene : fatty acid residues less than 2%, based on the weight of copolymer. | 100 | differential roll | 83 | 4 |
| Phenyl-α-naphthylamine | 1.5 | do | 84 | 2 |
| Benzothiazyl disulfide | 2 | | | |
| Dicapryl phthalate | 8 | do | 82 | 15 |
| A linear polyester of ethylene glycol and sebacic acid having an average molecular weight of 2,300. | 6 | | | |
| Benzothiazyl disulfide | 2 | | | |
| Channel black | 1 | do | 82 | 4 |
| Zinc Oxide | 5 | | | |
| Sulfur | 3 | | | |
| The stock is removed from the rolls and aged for 7 hours at room temperature. | | | | |
| Phenol-cashew-nut-formaldehyde resin | 25 | even speed roll | 73 | 7 |
| The stock is removed from the mill and aged at room temperature for 24 hours. | | | | |
| Phenol-cashew-nut-formaldehyde resin | 25 | even speed roll | 70 | 14 |
| Phenol-aldehyde resin | 80 | | | | and thereafter calendering out the compound, immediately after warming up, and at a temperature from 50° to 80° C. into a sheet from .005 to .020 inch thick.

3. A bonding film for friction elements comprising by weight

| | Parts |
|---|---|
| Butadiene-acrylonitrile copolymer (soap-free: containing from 30%–45% by weight acrylonitrile, balance butadiene) | 100 |
| Phenyl-α-naphthylamine | 0.75–1.5 |
| Benzothiazyl disulfide | 1.5–2.5 |
| Dialkyl phthalate (alkyl groups containing from 7 to 12 carbon atoms) | 6–10 |
| α,ω-Polymethylene dicarboxylic acid-glycol polyester plasticizer of molecular weight 1000–3000 | 5–10 |
| Zinc oxide | 3–8 |
| Sulfur | 2–6 |
| Cashew-nut shell oil modified phenol-formaldehyde resin | 40–60 |
| Phenol-formaldehyde resin | 70–90 | said cashew nut oil modified phenol-formaldehyde resin and said phenol-formaldehyde resin being mechanically dispersed as discontinuous phases in a continuous phase comprising the butadiene-acrylonitrile copolymer, and said film having been prepared by the process of claim 1.

4. A bonding film for friction elements comprising by weight

| | Parts |
|---|---|
| Butadiene-acrylonitrile copoylmer (soap free: containing 39% acrylonitrile, balance butadiene) | 100 |
| Phenyl-α-naphthylamine | 1.5 |
| Benzothiazyl disulfide | 2 |
| Dicapryl phthalate | 8 |
| Glycol-sebacic acid polyester of molecular weight 2300 | 6 |
| Zinc oxide | 5 |
| Sulfur | 3 |
| Cashew nut shell oil modified phenol-formaldehyde resin | 50 |
| Phenol-formaldehyde resin | 80 | said cashew nut oil modified phenol-formaldehyde resin and said phenol-formaldehyde resin being mechanically dispersed as discontinuous phases in a continuous phase comprising the butadiene-acrylonitrile copolymer, and said film having been prepared by the process of claim 2.

5. Process of adhering a friction facing element to a steel backing which comprises assembling the friction facing element upon the steel backing, interposing therebetween a bonding film comprising by weight

| | Parts |
|---|---|
| Butadiene-acrylonitrile copolymer (soap-free: containing from 30%–45% by weight acrylonitrile, balance butadiene) | 100 |
| Phenyl-α-naphthylamine | 0.75–1.5 |
| Benzothiazyl disulfide | 1.5–2.5 |
| Dialkyl phthalate (alkyl groups containing from 7 to 12 carbon atoms) | 6–10 |
| α,ω-dicarboxylic acid-glycol polyester plasticizer of molecular weight 1000–3000 | 5–10 |
| Zinc oxide | 3–8 |
| Sulfur | 2–6 |
| Cashew-nut shell oil modified phenol-formaldehyde resin | 40–60 |
| Phenol-formaldehyde resin | 70–90 | said cashew nut oil modified phenol-formaldehyde resin and said phenol-formaldehyde resin being mechanically dispersed as discontinuous phases in a continuous phase comprising the butadiene-acrylonitrile copolymer, and said film having been prepared by the process of claim 1, and heating the assembly at from 350° to 450° F. to cause the film to flow into contact with the facing element and backing and to become cured thereto.

6. Process of adhering a friction facing element to a steel backing which comprises assembling the friction facing element upon the steel backing, interposing therebetween a bonding film comprising by weight

| | Parts |
|---|---|
| Butadiene-acrylonitrile copolymer (soap free: containing 39% acrylonitrile, balance butadiene) | 100 |
| Phenyl-α-naphthylamine | 1.5 |
| Benzothiazyl disulfide | 2 |
| Dicapryl phthalate | 8 |
| Glycol-sebacic acid polyester of molecular weight 2300 | 6 |
| Zinc oxide | 5 |

| | Parts |
|---|---|
| Sulfur | 3 |
| Cashew nut shell oil modified phenol-formaldehyde resin | 50 |
| Phenol-formaldehyde resin | 80 | said cashew nut oil modified phenol-formaldehyde resin and said phenol-formaldehyde resin being mechanically dispersed as discontinuous phases in a continuous phase comprising the butadiene-acrylonitrile copolymer, and said film having been prepared by the process of claim 2, and heating the assembly at from 350° to 450° F. to cause the film to flow into contact with the facing element and backing and to become cured thereto.

7. An adhered friction assembly comprising a steel backing, a composition friction facing, and a cured adhesive film interposed therebetween comprising a bonding film comprising by weight

| | Parts |
|---|---|
| Butadiene-acrylonitrile copolymer (soap-free: containing from 30%–45% by weight acrylonitrile, balance butadiene) | 100 |
| Phenyl-α-naphthylamine | 0.75–1.5 |
| Benzothiazyl disulfide | 1.5–2.5 |
| Dialkyl phthalate (alkyl groups containing from 7 to 12 carbon atoms) | 6–10 |
| α,ω-polymethylene-dicarboxylic acid-glycol polyester plasticizer of molecular weight 1000–3000 | 5–10 |
| Zinc oxide | 3–8 |
| Sulfur | 2–6 |
| Cashew-nut shell oil modified phenol-formaldehyde resin | 40–60 |
| Phenol-formaldehyde resin | 70–90 | said cashew nut oil modified phenol-formaldehyde resin and said phenol-formaldehyde resin being mechanically dispersed as discontinuous phases in a continuous phase comprising the butadiene-acrylonitrile copolymer, and said film having been prepared by the process of claim 1.

8. An adhered friction assembly, comprising a steel backing, a composition friction facing, and a cured adhesive film interposed therebetween comprising a bonding film comprising by weight

| | Parts |
|---|---|
| Butadiene-acrylonitrile copolymer (soap-free: containing 39% acrylonitrile, balance butadiene) | 100 |
| Phenyl-α-naphthylamine | 1.5 |
| Benzothiazyl disulfide | 2 |
| Dicapryl phthalate | 8 |
| Glycol-sebacic acid polyester of molecular weight 2300 | 6 |
| Zinc oxide | 5 |
| Sulfur | 3 |
| Cashew nut shell oil modified phenol-formaldehyde resin | 50 |
| Phenol-formaldehyde resin | 80 | said cashew nut oil modified phenol-formaldehyde resin and said phenol-formaldehyde resin being mechanically dispersed as discontinuous phases in a continuous phase comprising the butadiene-acrylonitrile copolymer, and said film having been prepared by the process of claim 2.

WILLIAM J. NANFELDT.

REFERENCES CITED

The following references are of record in the file of this patent:

UNITED STATES PATENTS

| Number | Name | Date |
|---|---|---|
| 2,394,783 | Keller et al. | Feb. 12, 1946 |
| 2,398,890 | Howard | Apr. 23, 1946 |
| 2,405,038 | Jennings | July 30, 1946 |
| 2,457,003 | Spokes | Dec. 21, 1948 |
| 2,459,739 | Groten et al. | Jan. 18, 1949 |
| 2,473,319 | Winkelmann | June 14, 1949 |